Dec. 31, 1968 M. F. PIEL 3,419,702
GARMENT WITH ELECTRICALLY CONDUCTIVE HEATING ELEMENT
Filed Feb. 24, 1967 Sheet 1 of 2
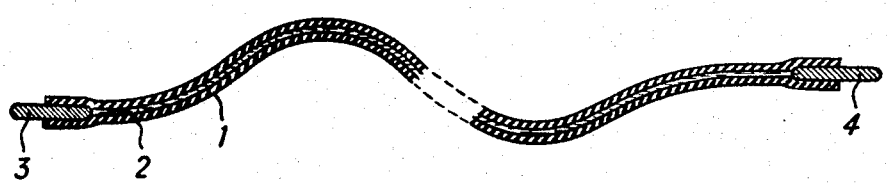
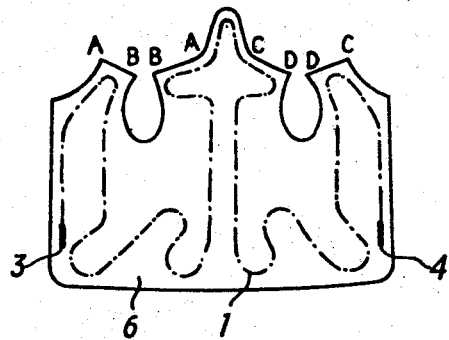
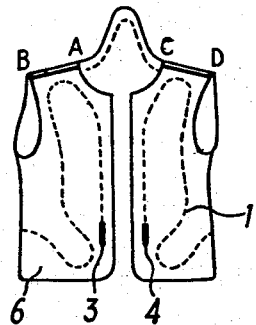
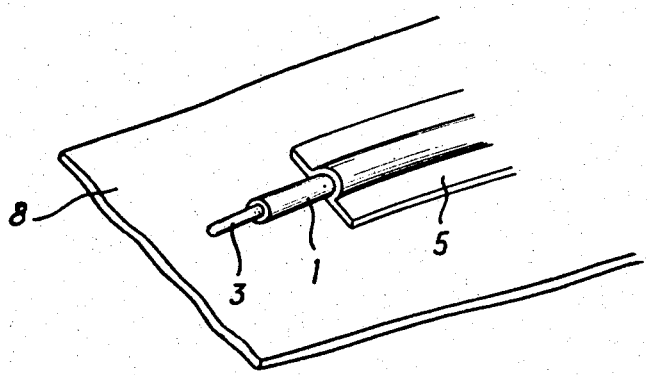
INVENTOR;
MICHEL F. PIEL
ATTORNEYS Dec. 31, 1968    M. F. PIEL    3,419,702
GARMENT WITH ELECTRICALLY CONDUCTIVE HEATING ELEMENT
Filed Feb. 24, 1967    Sheet 2 of 2

INVENTOR:
MICHEL F. PIEL
Browne, Schuyler Beveridge
ATTORNEYS

United States Patent Office 3,419,702
Patented Dec. 31, 1968

3,419,702
GARMENT WITH ELECTRICALLY CONDUCTIVE
HEATING ELEMENT
Michel F. Piel, 68 Ave. Ledru-Rollin, Paris 12, France
Filed Feb. 24, 1967, Ser. No. 618,411
Claims priority, application France, Feb. 28, 1966,
51,331
13 Claims. (Cl. 219—211)

ABSTRACT OF THE DISCLOSURE

A garment includes a flexible electrically conductive heating element formed of a flexible dielectric tube filled with a conductive liquid.

---

This invention relates to a novel electrically conductive element which may be used with advantage as a heating element, in particular for diving suits.

The conductive element according to the invention consists of an elastic, watertight electrically insulating capacitance which contains an electrically conductive fluid and which is provided with electrical connections between the inside and outside of the capacitance enabling the element to be connected to a source of electrical energy for passing a current through the fluid contained in the capacitance.

In one preferred embodiment, the element according to the invention consists of a hollow rubber tube which is filled with mercury and provided at both ends with contacts.

The elastic watertight capacitance of the element according to the invention which should be dielectric enough to insulate the conductive fluid with which it is filled may be made for example from natural rubber, synthetic rubber (for example silicon rubber) or from a plastic material, particularly one of the elastomeric type.

Although the capacitance of the element according to the invention may be made in a variety of shapes, it is preferably made in the form of a tube which enables the element itself to be made in the form of a filament upon which any desired path may readily be imposed, or in the form of a band.

It was found after numerous tests that it is of particular advantage to give the elastic, watertight and dielectric tube an outer diameter of approximately 3 to 4 mm. for a considerably smaller internal diameter, for example 0.5 to 1 mm. and preferably nearer 0.8 mm.

The effect of this relatively large thickness of the tube is that the conductive fluid which it contains is surrounded by enough elastic material not to be interrupted when the tube is folded. Accordingly, the fairly high value of the ratio between the internal and external diameters of the tube simultaneously ensures the continuity of the inner zone of the tube, despite the weight of the fluid present in the tube, and the continuity of this zone despite possible folding of the tube.

The reference made above to the weight of the conductive fluid applies particularly where this fluid is mercury, mercury being particularly preferred for the purposes of this invention.

It will be appreciated, however, that the invention is not limited to the use of mercury. The capacitance or the tube of the element according to the invention, may be filled with any conductive, nonelectrolysable liquid ensuring the absence of air bubbles from the tube or capacitance after filling, so as to avoid a break or interruption in the column formed by the conductive fluid.

The electrical connecting means enabling a current to be passed through the conductive fluid of the heating element according to the invention, may be contacts mounted on the capacitance in such a way as to allow current to pass between the outside and inside of the dielectric envelope of the element.

In cases where this envelope is in the form of a tube, the contacts may with advantage consist of conductive cylinders fitted like plugs at each of the two ends of the tube. At the same time, the elasticity of the tube may be used to advantage to hold the contacts in position at the ends of the tube.

The contacts may be made of any suitable conductive material although, when the fluid inside the tube is mercury, it is particularly preferred in accordance with the invention to make the contacts of pure copper insofar as the electrical contact between the contacts themselves and the fluid conductor in the tube is improved by the tendency which mercury has to form an amalgam with copper.

The novel conductive element according to the invention which may be used to particular advantage as an electrical resistance variable with the deformation of the element made possible by the elasticity of the envelope, has the following major advantages:

The substantially flexible element is readily able to follow any path imposed on it.

There is no risk of short-circuiting between two adjacent elements because any contact between the two columns of conductive fluid would imply that their envelopes had been broken which, from the outset, would have caused a loss of conductive fluid and hence a break in current.

If necessary, the flow of current through the element may be temporarily interrupted either by pinching or by bending the element with some force.

Under certain circumstances, the element acts as an automatic current interrupter in view of the fact that, beyond a certain temperature limit, mercury vaporises locally, giving rise to the formation of a break in the column of mercury in the tube which is accompanied by a break in the current, until the temperature falls to a value below the critical limit.

These features make the element according to the invention particularly suitable for use in the production of measuring instruments and heating circuits, for example for heating linings, coverings, clothing, etc.

So far as heating clothing is concerned, the element according to the invention may be applied with particular advantage to fitted diving suits made of elastic materials, for example the neoprene suits of the kind described in U.S. patent specification No. 2,981,954.

To be close-fitting, these suits have to be extremely elastic, and the inclusion in them of a network of electric wires for generating heat by Joule effect, so essential when the diver descends to great depths, detrimentally affects both the elasticity and the fit of the suit.

It should be noted that, apart from this, the electric wires cannot be wound in the form of springs which would give them a certain amount of elasticity, because this form would be too cumbersome.

By contrast, the elasticity of the element according to the invention makes it eminently suitable for use as a heating-circuit element for garments of this kind.

In practice, it is possible to use for example a tubular element having a resistance of around 0.5 to 5 ohms per metre.

The heating element according to the invention may be fitted in a diving suit by any appropriate means which do not affect the elasticity of the suit, for example by bands of rubber or any other elastic material which covers the element according to the invention at intervals and which are bonded at their ends to the inner surface of the diving suit.

In certain applications of the conductive element according to the invention and, in particular, in its application to heated clothing, it is very desirable to be able to vary the heat effect produced by the element.

In conventional heated clothing where the heating elements consist of resistance wires, it is standard practice to alter either the supply voltage of the wires or the period for which the wires are supplied in order to vary the heat effect of the clothing and in particular to limit this effect to a level acceptable by the wearer.

Both these methods are attended by disadvantages, with the result that other methods have been developed comprising for example varying the heating circuit by providing it with a number of branch circuits which may be used in various combinations, interrupting the feed of the circuit beyond a certain temperature or using a rheostat, all of which are also attended by certain disadvantages.

It is possible by virtue of the very structure of the heating element according to the invention to avoid using the various solutions which have just been described to vary the heat output of the element. Instead, the invention provides a novel means of regulation, comprising a means for regulating the volume of the conductive fluid present in the element, any variations in this volume being accompanied by a variation in the internal cross-section of the element and consequently by a variation in its electrical resistance and hence in the heat generated by Joule effect.

A simple means which may be used arbitrarily to vary the volume of the conductive fluid and hence the volume of the elastic capacitance in which it is present, consists of a piston displaceable in a cylinder communicating with the inside of the heating element containing the conductive fluid.

The accompanying drawings show more clearly by way of examples how the element according to the invention may be applied in practice and used in the production of heated clothing.

FIGURE 1 is a longitudinal section through the element.

FIGURE 2 shows how this element can be attached to an elastic sheet.

FIGURE 3 shows an open vest or waistcoat, to which the element according to the invention is applied.

FIGURE 4 shows the vest as it is worn.

Figure 6:
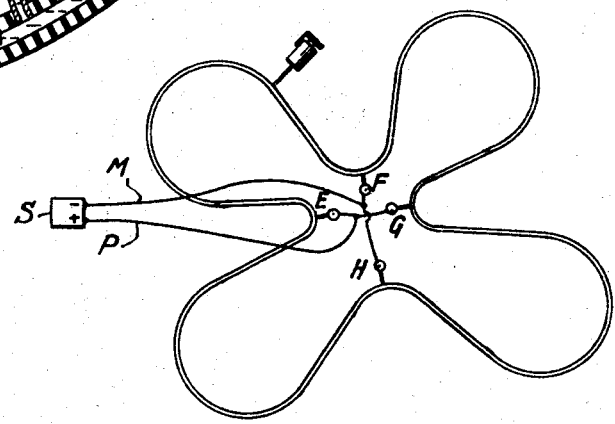
Figure 7:
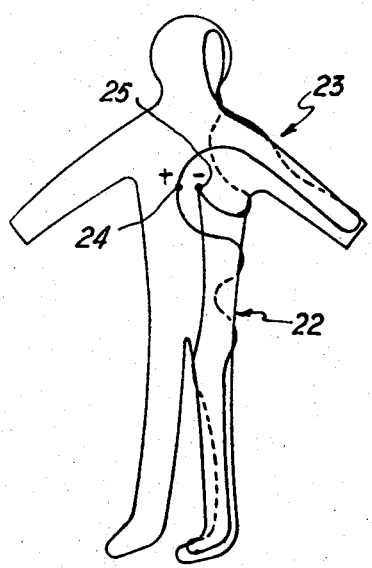

FIGURE 6 diagrammatically illustrates a branch of a heating circuit equipped with this means, and FIGURE 7 diagrammatically illustrates an article of heated clothing equipped with a circuit of the type shown in FIGURE 6.

In the embodiment shown in FIGURE 1, the heating element consists of a rubber tube which is filled with mercury 2 and which is plugged at both ends by contacts 3 and 4 made of copper which are intended to be connected to a current source in the garment equipped with this element.

FIGURE 2 shows the element illustrated in FIGURE 1 mounted on an elastic sheet 8 against whose surface it is held by means of a band 5. This band may either be continuous, as shown in FIGURE 2 or noncontinuous. It may be attached to the sheet 8 by means of an adhesive or by stitching.

FIGURES 3 and 4 show unfolded and folded, respectively, a vest to which the heating element according to the invention is to be fixed following the path chosen. This vest 6 is shown flat in FIGURE 3 which illustrates the pattern of the vest, the sections AB and the sections CD being put together letter by letter to make up the vest which is shown in its completed form in FIGURE 4.

The current source by which the conductive element according to the invention is fed, has not been shown in the drawings.

The choice of the path imposed upon this conductive element should be such that the most sensitive areas are the most effectively heated.

In a fitted diving suit, allowance has to be made for example for the shoulders, the abdomen, the chest, the back, the spine and the neck. In addition, allowance has to be made for the sensitivity of the body to hot spots. This sensitivity is extremely low in the sense that a filiform zone along the back for example gives the impression that the entire back is heated.

The conductive element may be attached to the inner surface of the diving suit along the path selected in the manner shown in FIGURE 2, although the element could even be directly secured adhesively to the garment or even overlapped by zig-zag stitching.

The resistance range of 0.5 to 5 ohms per metre mentioned earlier on is generally suitable for a diving suit in which the heating element may be between 5 and 10 metres long for example.

Accordingly, the data given above may depend on one another and are governed by the nature of the heating liquid.

In practice, the power to be dissipated by the heating element and the path imposed upon it by those areas of the body which it is desired to heat, will generally be considered as basically known. By way of example, an output of 30 watts may adequately be dissipated by a five-metre-long heating element containing mercury and having such an internal cross-section that the resistance of the heating element is approximately 1 ohm per metre. This element may be fed by a 12-volt battery.

It will be appreciated that these values are given solely by way of example. They are also governed by the maximum temperature to which it is desired to subject the element. In the case of a diving suit, for example, this maximum temperature is around 60° C., although it does differ in dependence upon the purpose for which the element is used.

Figure 5:
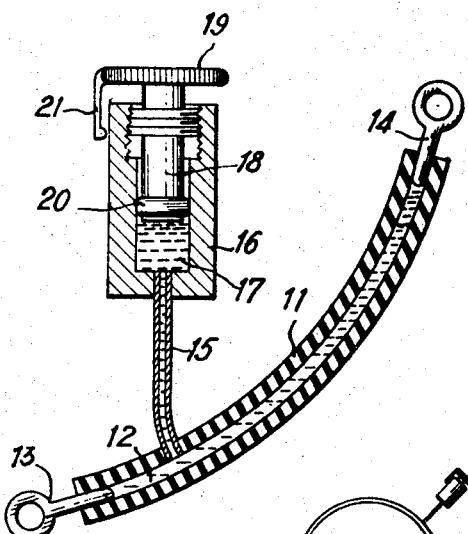
FIGURE 5 is a diagrammatic section through an element equipped with a control means for varying the conductive volume of the element.

As shown in FIGURE 5, a heating element consisting of a rubber tube 11 filled internally with mercury 12 and plugged at both ends by conductive contacts 13 and 14, is joined by a tube 15 to a cylinder 16 comprising an inner bore 17 which communicates through the tube 15 with the inside of the heating element and in which a piston 18 is displaceable, for example under the control of a knurled button 19 arranged to displace the piston when it is turned, the outer surface of the piston being provided at one point with a screwthread co-operating with a corresponding internal screwthread in the cylinder 16. The piston 18 may be provided with sealing means, for example in the form of an O-ring 20 to prevent loss of mercury. The outer surface of the cylinder 16 may be graduated, for example in units of temperature according to a suitable scale, the knurled button 19 being provided with an index 21 passing in front of the graduations of the cylinder when the button is turned.

By thus displacing the piston, the mercury is distributed between the heating element and the bore of the cylinder, any variation in the volume of mercury in the bore under the effect of the displacement of the piston, being accompanied by a corresponding, but opposite variation in the volume of mercury in the heating element, with a corresponding modification in the internal diameter of the elastic tube.

The coupling tube 15 may also be elastic or inelastic, depending on the conditions of use.

FIGURE 6 diagrammatically illustrates a heating circuit with four branches EF, FG, GH, HE connected in parallel to the terminals of a direct-current source S by means of two conductors P and M which respectively connect the positive pole of the source to the terminals and of the circuit, and the negative pole of the source to the terminals F and H of the circuit. At any given point, the circuit which consists of an elastic tube according to the invention disclosed in the parent patent is joined to a means for regulating the volume of its conductive fluid, as mentioned earlier on.

FIGURE 7 diagrammatically illustrates a heated garment equipped with a four-branch circuit of the kind shown in FIGURE 6, of which the lower left-hand branch 22 is intended to heat the lower left-hand half of the body, and the upper left-hand branch 23 the upper left-hand half of the body. In this embodiment, the two contacts of similar sign of the circuit are combined to form a single contact, with the result that the circuit has only one positive contact 24 and only one negative contact 25 which are intended to be connected to the corresponding poles of a direct-current source which, for example, is in the form of a battery attached to the belt of the garment. The means for regulating the volume of conductive fluid in the heating circuit, have not been shown in FIGURE 7 for the sake of clarity. In practice, the cylinder and its piston may also be attached to the belt of the garment.

A mercury-filled rubber tube with an external diameter of 3 mm. and an internal diameter of 0.8 mm., offers a resistance of 1.2 ohms per metre, and each of the branches may be made of 6.65 metres of tubing, which gives a resistance of 8 ohms per branch, i.e., a resistance of 2 ohms for the circuit as a whole, the four branches being in parallel.

A circuit of this kind fed by a 24-volt battery has a power consumption of 288 watts, and experience has shown that it is very easy to vary the power in a range from 100 to 300 watts with a device of the kind described.

The invention is not limited to a particular means for varying the volume of conductive fluid in the heating circuit, and the piston mechanism has only been given as a preferred but by no means limiting example.

It will also be appreciated that, although it is preferred to accommodate the heating circuit in the diving suit itself, either on the inner surface of the suit or in the actual material from which it is made, the heating circuit may also be attached to a undergarment worn by the diver.

What I claim is:

1. A heated garment which includes a foldable heating element attached to the garment along a chosen path, said element having a watertight hollow tube made of an elastic and insulating material, said tube containing a conductive and nonelectrolysable liquid, said tube being provided with electrical connectors for attachment to a current source to allow a current to pass through the liquid in said tube to generate heat by Joule effect in said liquid.

2. A heated garment as claimed in claim 1, wherein the said tube has an external diameter of between 3 and 4 mm. and an internal diameter of between 0.5 and 1 mm.

3. A heated garment as claimed in claim 1, wherein the said liquid is mercury.

4. A heated garment as claimed in claim 3, wherein the electrical connecting means are contacts made of a material capable of forming an amalgam with mercury.

5. A heated garment as claimed in claim 4, wherein the contacts are made of pure copper.

6. A heated garment as claimed in claim 1, wherein the electrical connecting means are contacts acting as plugs at the ends of the tube.

7. A heated garment as claimed in claim 1, wherein said material is a rubber material.

8. A heated garment as claimed in claim 1, wherein said material is an elastomeric plastic material.

9. A heated garment as claimed in claim 1, wherein regulating means are provided for regulating the volume of said liquid inside the said tube and thereby varying the heating effect.

10. A heated garment as claimed in claim 9, wherein said regulating means consists of a piston displaceable in a bore communicating with the inside of the tube.

11. A heated garment as claimed in claim 1, in which the heating element is attached to the inner surface of the garment.

12. A heated garment as claimed in claim 1, in which there are several heating elements connectable in parallel to said current source.

13. A heated garment as claimed in claim 1 wherein the garment when on a wearer includes a tubular body-enclosing portion.

References Cited

UNITED STATES PATENTS

| | | | |
|---|---|---|---|
| 730,847 | 6/1903 | Van Gilder et al. | 174—9 |
| 1,955,005 | 4/1934 | Maloney | 174—9 |
| 2,441,831 | 5/1948 | Moore | 338—222 X |
| 2,517,553 | 8/1950 | Fowler | 338—114 X |
| 2,518,906 | 8/1950 | Kocmich | 338—114 |
| 3,153,720 | 10/1964 | Petronio et al. | 219—211 |
| 3,304,528 | 2/1967 | Rastrelli et al. | 338—2 |
| 3,332,280 | 7/1967 | Fish et al. | 73—88.5 |

FOREIGN PATENTS 760,320  10/1956  Great Britain.

BERNARD A. GILHEANY, *Primary Examiner.*

V. Y. MAYEWSKY, *Assistant Examiner.*

219—285; 165—46; 128—402; 338—222, 80, 114; 219—527; 174—9